(12) United States Patent
Rockwood

(10) Patent No.: US 6,828,965 B2
(45) Date of Patent: Dec. 7, 2004

(54) REGULARIZATION OF IMPLICIAL FIELDS REPRESENTING OBJECTS AND MODELS

(75) Inventor: Alyn Rockwood, Colorado Springs, CO (US)

(73) Assignee: Mitsubishi Electric Research Labs, Inc., Cambridge, MA (US)

(*) Notice: Subject to any disclaimer, the term of this patent is extended or adjusted under 35 U.S.C. 154(b) by 192 days.

(21) Appl. No.: 09/862,902

(22) Filed: May 22, 2001

(65) Prior Publication Data

US 2002/0175913 A1 Nov. 28, 2002

(51) Int. Cl.[7] ............................................. G06T 17/00
(52) U.S. Cl. ....................................................... 345/420
(58) Field of Search ................................ 345/422, 419, 345/420

(56) References Cited

U.S. PATENT DOCUMENTS 4,912,624 A * 3/1990 Harth et al. .................. 700/36
6,483,518 B1 * 11/2002 Perry et al. .................. 345/590

OTHER PUBLICATIONS

Distance Field Manipulation of Surface Models, Payne et al., Jan. 1992, IEEE, pp. 65–71.*

* cited by examiner

Primary Examiner—Mark Zimmerman
Assistant Examiner—Scott A Wallace
(74) Attorney, Agent, or Firm—Dirk Brinkman; Andrew J. Curtin

(57) ABSTRACT

A method regularizes a distance field of a graphics model or object. The distance field includes variable scalar values and a set of fixed zero values. The zero values define a boundary or surface of the object. The distance field is evaluated by a cost function, optimized according predetermined parameters, to determine a cost of the distance field. The variable scalar values are then randomly perturbed while holding the zero values fixed. The evaluating, determining, perturbing steps are repeated until the cost is less than a predetermined threshold. The distance field can be in the form of a non-differentiable implicial field. A surface of the graphics model can be textured or stenciled by following streamlines along the gradients of the regularized distance field.

18 Claims, 9 Drawing Sheets

REGULARIZATION OF IMPLICIAL FIELDS REPRESENTING OBJECTS AND MODELS

FIELD OF THE INVENTION

The present invention relates generally to the art of representing shapes of objects and models, and more particularly to computer implemented methods for operating on the represented shapes.

BACKGROUND OF THE INVENTION

Rivaling polygons, distance fields are well known as fundamental primitive for representing objects and models in computer graphics, see for example, U.S. Pat. No. 6,040,835 issued to Gibson on Mar. 21, 2000, and U.S. Pat. No. 6,084,593 issued to Gibson on Jul. 4, 2000.

In the prior art, a distance field is usually described with the notion that every point in space is associated with a "minimum" distance to a surface on the object or model. This notion derives both from natural experience and the classic definition in mathematics in which a distance from a point y in a metric space to a set A is given by the infimum $$D(y,A)=\inf_{x \in A} D(x,y),$$

where $D(x,y)$ is a standard metric such as the Manhattan distance, i.e. the sum of absolute differences of components, the Euclidean distance, i.e., the square root of the sum of the squares of the components, or the infinity norm, i.e. the maximum of the absolute differences of the components; known respectively as the $l_1$, $l_2$ and $l_\infty$ norms.

Whatever the metric, a traditional distance field requires searching for a point on a surface of the object or model that is closest to a point in space, i.e., a point in the distance field. For example, the distance field can be determined by an intensive method that finds a nearest point on the surface to any given point in space by casting sample rays from the point in space, and then using Newton's approximation method to converge on the point on the surface. This search can be time-consuming and complicated. Furthermore, the search can be subject to many optimization pitfalls.

Unfortunately, the traditional notion of the minimum distance also excludes many useful shapes. Implicitly defined shapes, for example, do not reference a minimum distance, nor do they necessarily designate a closest point on a surface of the object to allow one to completely define the distance field.

For example, with an implicit function $f(x)=20x^2+y^2+z^2-1$, any point x in three-dimensional space $f(x)$ represents a very usable distance to the flattened ellipsoid defined by $f(x)=0$, an algebraic, i.e., non-Euclidean, distance that has no minimum or closest point in the calculation. Level sets, interpolation schemes, measured equipotential fields and procedural methods are other examples for which distance fields either fail to represent, or impose unnecessary computational burdens on the representation. In addition, repeated operations on distance field can degrade quality of the field, making further operations inaccurate, unpredictable, or worse, impossible to perform.

For example, FIG. 1a shows contracting streamlines 101 of a cubic implicial test function on a test surface 102, and FIG. 1b expansion and twist of streamlines 103 on the test surface 104. There are eight streamlines emanating from the four corners and four midpoints of the depicted square 105. In FIG. 1a, the streamlines 101 contract as they flow to the surface in a region of concavity. In FIG. 1b, the streamlines 102 expand to meet a region of convexity 102. The streamlines in FIG. 1a also exhibit some twist to the flux, especially where the horizontal beginning points on the square project 105, with a turn, onto the convex surface. It would be desirable to minimize the contraction, expansion and rotation of the streamlines.

FIG. 2a shows a more tortuous path of streamlines 201 when the object or model has a small amount of texture. FIG. 2b shows a complete failure in the streamlines due to a lager amount of texture. This is due to the fact that the distance field has a large number of local minima that trap the streamlines.

It is desired to regularize a field surrounding shapes of objects and models so that repeated operation such Booleans, blending and texturing can be applied without deleterious effects on the field.

SUMMARY OF THE INVENTION

The invention provides a method for regularizing a distance field of a graphics model or object. The distance field includes variable scalar values and a set of fixed zero values. The zero values define a boundary or surface of the object.

The distance field is evaluated by a cost function, optimized according predetermined parameters, to determine a cost of the distance field. The variable scalar values are then randomly perturbed while holding the zero values fixed. The evaluating, determining, perturbing steps are repeated until the cost is less than a predetermined threshold.

The distance field can be in the form of a non-differentiable implicial field. A surface of the graphics model can be textured or stenciled by following streamlines along the gradients of the regularized distance field.

DETAILED DESCRIPTION OF THE PREFERRED EMBODIMENT

Implicial Fields

The present invention defines an implicial field for an object or model as a scalar field $d: R^n \to R$ in which the zero set $d^{-1}(0)$ is not empty. This definition requires that the implicial field fulfills syntactical constraints, i.e., a scalar, and a non-empty zero set.

It should be understood that implicial fields, in contrast to prior art distance fields, can be generated by other than implicit functions. As defined above, distance fields, level sets, interpolation schemes, measured equipotential fields, and computer implemented procedures can also generate implicial fields from objects or models. Therefore, it is correct to state that the implicial field according to the invention is the result of a process that implicitizes the object or the model. In the case of implicit functions, the implicial field may re-implicitize the object or model.

As a simple example, consider an implicitly defined function such as $$d(x)=20x^2+y^2+z^2-1. \quad (1)$$

For any point x in three-dimensional space where d(x) is a scalar field, there exists a flattened ellipsoid zero set defined by d(x)=0. Although functions like equation (1) represent a large class of implicial fields, it is a mistake to assume that implicial fields are limited only to "implicitly" defined functions.

Some other implicial fields include fields where a value of d(x) is determined by finding a point on the object or model that is closest to x in some norm. Implicial fields can also be generated for fractals, equipotential fields, such as gravity, electromagnetic fields, and acoustic fields.

As defined above, the zero set of the implicial field essentially defines the outline, shape, or surfaces of the object or model. The surfaces can be external or internal, or some other iso-surface. Therefore, the zero set of an implicial field is extremely useful for defining objects and models in CAD/CAM, scientific visualization, and computer graphics applications. In addition, the above definition enables operations such as Booleans, offsetting, collision detection, morphing, filleting, or rendering methods, obviously of great importance to any of the above mentioned rendering techniques.

EXAMPLES OF IMPLICIAL FIELDS AND OPERATIONS ON IMPLICIAL FIELDS

Booleans and Fillets

If f and g are two implicial fields with zero sets A and B, then the Boolean union, intersection and difference of the zero sets are given respectively by $$A \cup B \equiv \{x | \min(f(x), g(x))=0\}, \quad (2)$$

$$A \cap B \equiv \{x | \max(f(x), g(x))=0\}, \quad (3)$$

$$A \setminus B \equiv \{x | \max(f(x), -g(x))=0\}. \quad (4)$$

Multiple Booleans are obtained by combinations of the Boolean functions in equations (2–4).

Discontinuities

The min/max functions may generate discontinuities of derivatives when f(x)=g(x), i.e., f(x) and g(x) are non-differentiable implicial fields.

Figure 3A:
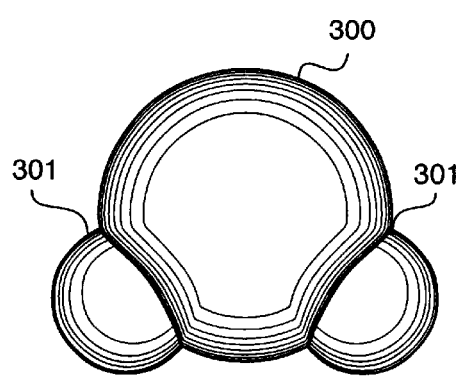
FIG. 3a shows a model of a water molecule generated by a Boolean union operation on an implicial field according to the invention.

FIG. 3a shows the union of three zero sets 311–312 of implicial fields generated from spheres configured to model a water molecule (H$_2$O) 300. The spheres are defined with the square root of the components squared. The Boolean operators create ridges 301 along cones of non-differentiability. With implicial fields f(x), g(x) and h(x), the new implicial field of the union is $$\min(\min(f(x),g(x)), h(x)). \quad (5)$$

In this case, the non-differentiability exhibits itself as creases in the zero set.

Figure 3B:
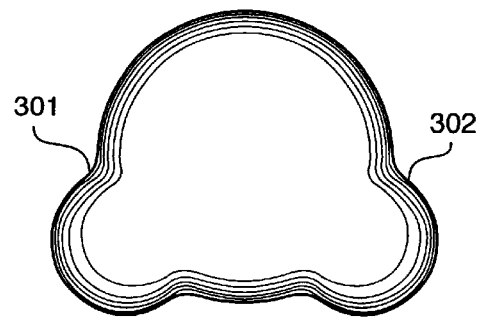
FIG. 3b shows the model of FIG. 3a with blending.

As shown in FIG. 3b, one can apply a blending operation to turn the creases into smooth fillets 302. The blending operation yields an implicial field $$b(x)=1-\max(1-(x)/R,0)^2-1-\max(1-g(x)/R,0)^2-1-\max(1-g(x)/R, 0)^2, \quad (6)$$

where R is the blending range chosen to determine the size of the fillet.

However, blending still leaves other discontinuities in the derivatives because of the max functions in equation (6). However, a rendering of the implicial field no longer exhibits creases in the zero set, and can be shown to have continuous normals given by $\nabla b(x)$ wherever b(x)=0.

Figure 4:
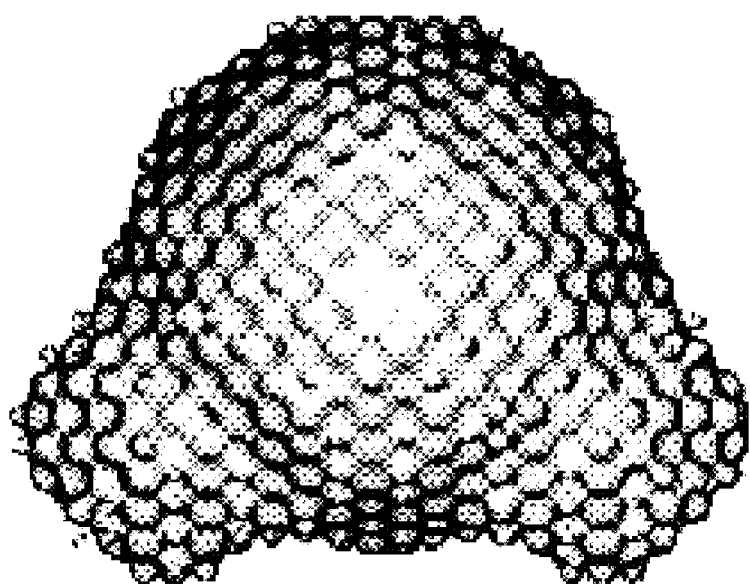
FIG. 4 shows the model of FIG. 3a with texturing.

FIG. 4 shows a rendering of the water molecule 400 of FIGS. 3b where a relief texturing operation is applied to the zero set, The relief texturing adds the additional implicial field $$T(x)=A \sin(ax)\sin(ay)\sin(az), \quad (7)$$

for constants A and a. In other words we define a new implicial field g(x)=d(x)+T(x). This additive split is useful to separate primary shape given by d(x)=0 from fine detail added by the additive implicial field T(x).

Discrete Structures

A discrete implicial structure (DIS) is defined as a finite set of discrete points or parameters from which an approximation to an implicial field can be constructed. A simple DIS is, for example, an equally sampled volume of points surrounding the zero set and the associated implicial field values of the points; thus, $S=\{x_i, d(x_i)\}$.

Any number of interpolation techniques can then be used to approximate the implicial field from S. Examples of interpolation techniques include octtree or binary space partitioning (BSP) tree representations, wavelets and many others. Examples of spatial data structures are presented by Samet, in "*The Design an Analysis of Data Structures,*" and "*Applications of Data Structures,*" Addison-Wesley, 1989.

Regularizing a Distance Field

As stated above, repeated operation can degrade a distance field. In addition, some distance fields can be irregular to start with. Therefore, my invention provides a method for regularizing, i.e., smoothing, an implicial field while maintaining the invariance of the zero set of the implicial field. My method reforms the non-zero portion of a discretely stored implicial field as a constrained minimization.

Figure 5A:
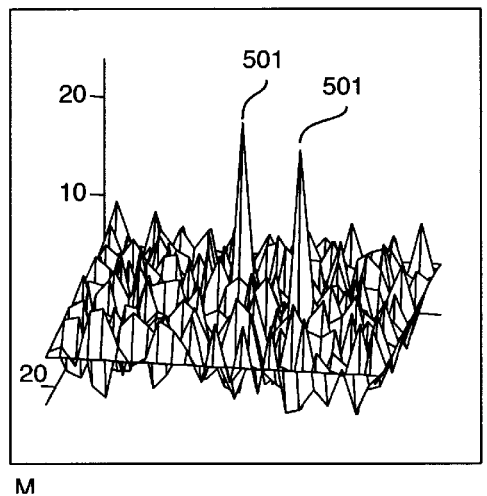
FIG. 5a shows a random distance field.
Figure 5B:
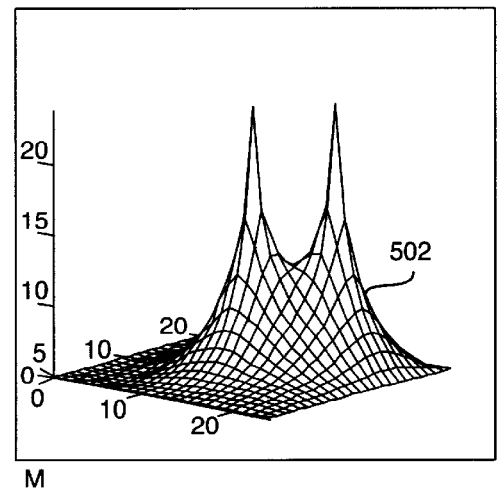
FIG. 5b shows the random field regularized according to the invention.

As shown in FIGS. 5a and 5b, it is easiest to describe the advantage of the present invention in two dimensions. A worst possible scenario is contrived in FIG. 5(a), where the two peaks 501 represent the zero set and the rest of the implicial field are generated randomly.

In order to "smooth" or regularize the implicial field so that repeated rendering operations can be enabled, the zero set and the boundary of the implicial field are constrained, while the other values of the field are allowed to vary. Using a simulated annealing process, the values of the implicial field values are perturbed and input to a cost function, which corresponds, e.g. to the area of the surface. If the area decreases, a new state may be accepted.

As the cost function converges, the amount of perturbation is decreased and the likelihood of acceptance increased, until very little change in the area is noted. The minimization of area yields a minimal energy surface, or "a soap film" 502, as shown in FIG. 5b. In this form, the regularized implicial field according to the invention become much more useable than prior art unregularized distance fields without changing the zero set itself.

Figure 6:
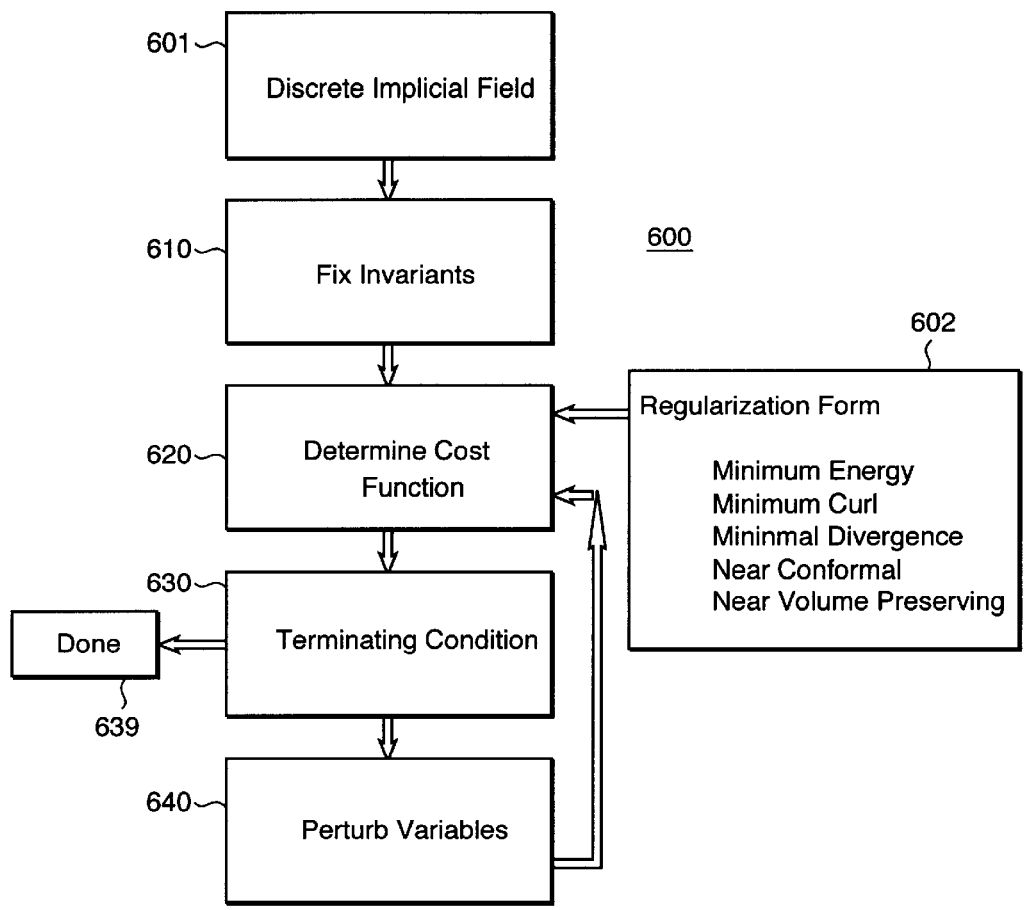
FIG. 6 is a block diagram of the regularization method according to the invention.

FIG. 6 shows a method 600 that regularizes the implicial field of the invention. The method 600 has two inputs 601–602. The first input is a data structure or procedure 601 representing the object or model, e.g. a distance field or an implicial field. The data structure 601 can be in the form of sampled data, e.g., an octtree, a kd-tree or some other form. Fixed, i.e., invariant, data are those that represent the boundary of the implicial field, and the zero set; All invariant data is fixed in step 610.

The second input includes parameters 602 for optimizing a cost function 620, e.g., minimum energy, minimum curl, minimum divergence, minimum Jacobian, minimum Laplacian, near conformal, or near volume preserving. These constraints can minimize surface area, unwanted rotations, contractions or expansions, and can provide nearly equal area maps and decrease angle distortions, i.e., any distortions are near conformal. Possible cost functions include simulated annealing, downhill simplex method, or conjugate gradient methods based on differing predicates.

Terminating conditions 630 for the cost function 620 include a predetermined minimum cost or a rate of change in the cost. When the terminating condition 630 is met, the method 600 is done in step 639.

In step 640, the variables, e.g., the sample points of the implicial field, are perturbed. The perturbation can be random. The perturbed variables are reevaluated by the cost function 620, steps 630 and 640 are repeated until the termination condition 630 is satisfied.

Figure 1A:
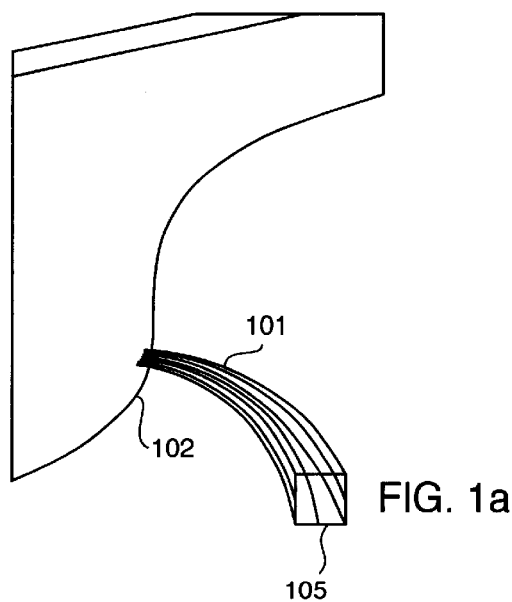
FIGS. 1a–b shows a model with streamlining.
Figure 1B:
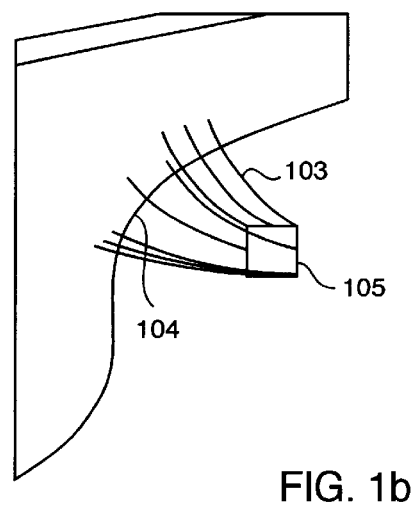
Figure 2A:
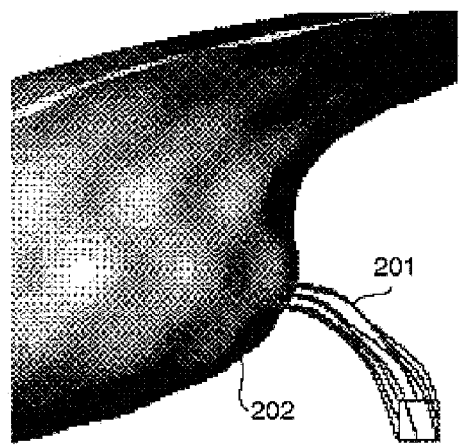
FIG. 2a shows a model with small texturing and streamlining.
Figure 2B:
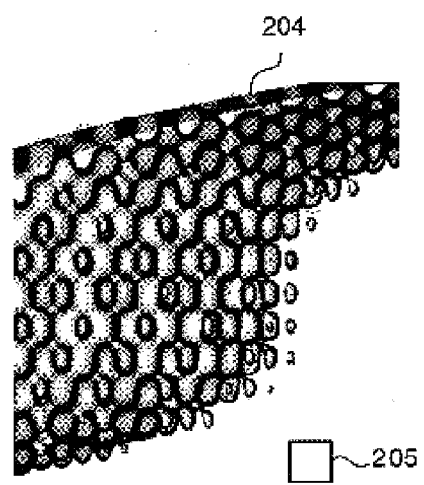
FIG. 2b shows the model of FIG. 2a with large texturing and no streamlining.
Figure 7A:
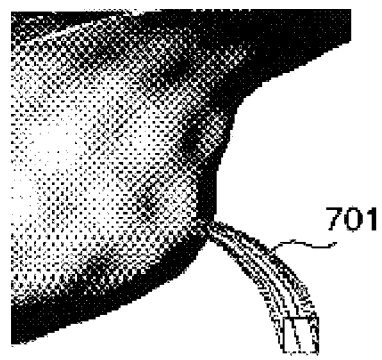
FIG. 7a–b shows the model of FIGS. 1a–b after regularization according to the invention.
Figure 7B:
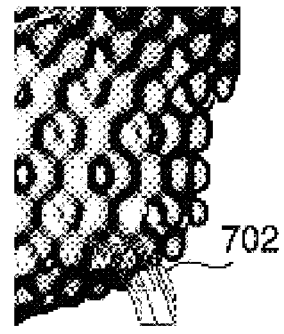

FIGS. 7a–b show the positive effects of regularizing the implicial field. FIG. 7a shows the smooth streamlines 701 after the implicial field has been regularized by the method 600. Furthermore, the smoothing is accomplished without changing the zero set. The streamlines are smoother, and more rapidly computed by an order of magnitude. Furthermore, the contraction of the streamlines seen in FIG. 1a is lessened in the presence of a positive change in the divergence of the implicial field in that region. FIG. 7b shows streamlines 702 after implicial field regularization of the highly textured field of FIG. 1b. With prior art distance fields, it is not possible to compute smooth streamlines art all.

When one considers that the streamlines follow the normals of the offset surfaces, i.e., the streamlines are perpendicular to the offsets, then FIG. 7b gains greater significance. After smoothing the implicial field, the streamlines flow reasonably straight until they are near the zero set where they exactly match the strong undulations close to the surface defined by the zero set.

Figure 8A:
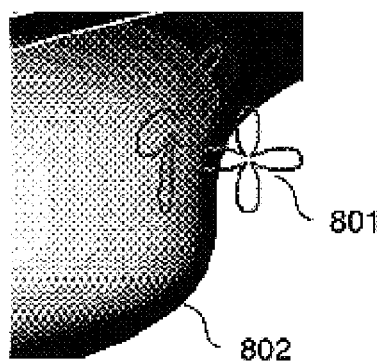
FIGS. 8a–b show the projection of a viewing plane onto the surface of a model using the regularization according to the invention.
Figure 8B:
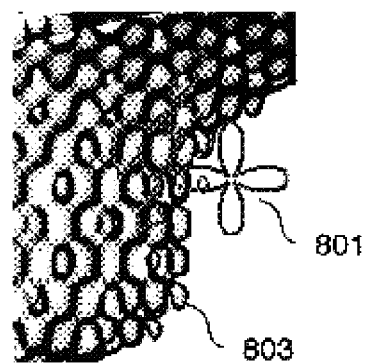

FIG. 8a shows a parameterization between an arbitrarily position image and a cubic zero set via streamlines of the gradient field of the regularized distance field. The parametrically defined petal 801 is mapped to the surface 802 by taking each (x, y) location of the petal in the image and following its regularized streamlines to the zero set, i.e., the surface. FIG. 8b shows how regularization can be used to stencil the same petal onto a very difficult implicial field due to the highly textured surface 803, which would otherwise not be possible.

Figure 9:
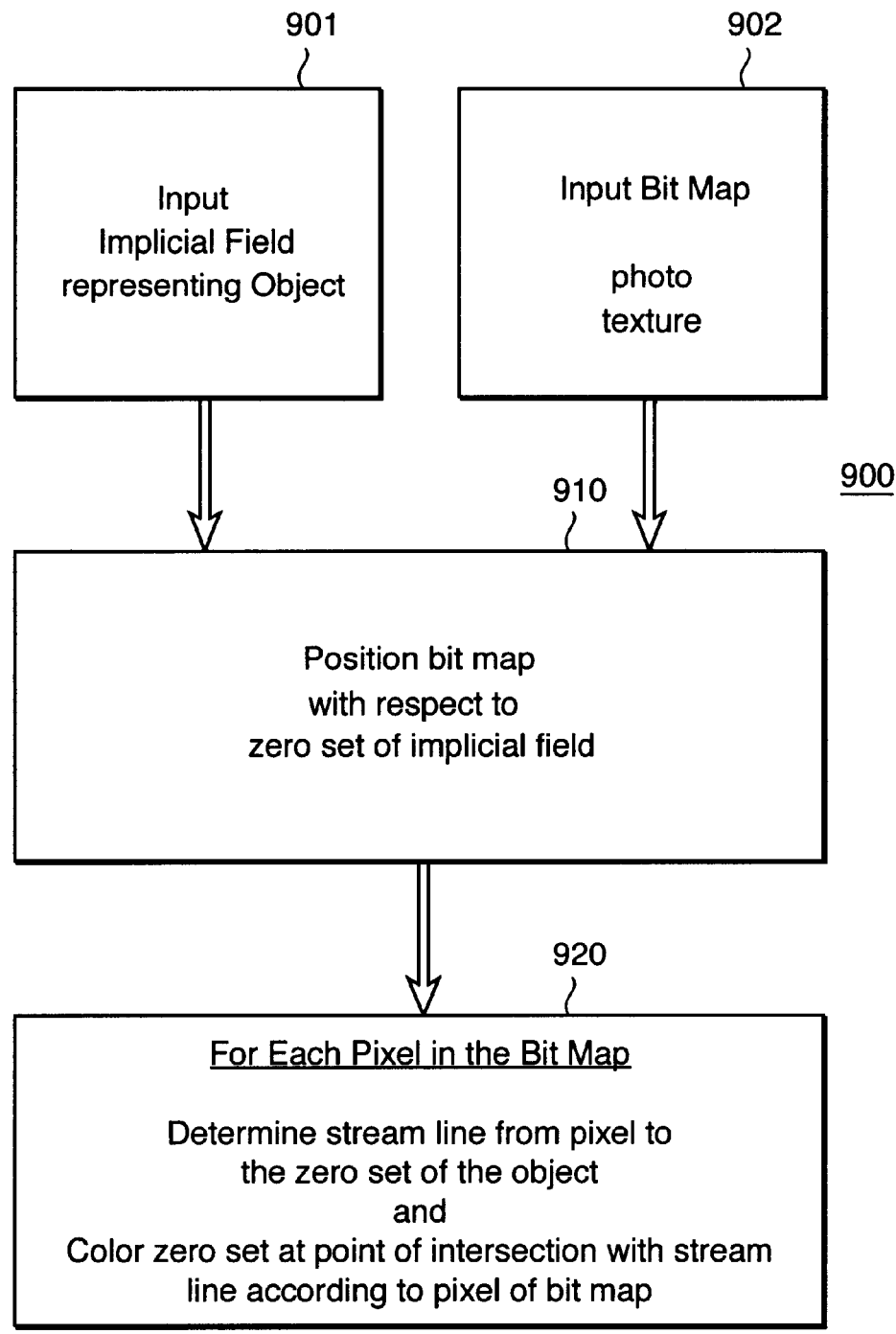
FIG. 9 shows is a block diagram of a method for positioning a bit map according to a regularized field.

FIG. 9 shows a texturing procedure 900 which uses the regularized implicial field according to the invention. Input to the procedure is regularized implicial field 901 representing an object, and a bit map 902 representing a texture. In step 910, the bit map is positioned with respect to the zero-set of the implicial field. Step 920 determines, for each pixel in the bit map, a streamline to a correspond value in the zero set, and textures, e.g., colors, the zero set point according to the color of the corresponding pixel in the bit map.

My invention provides a method for regularizing distance fields. When an object or model is represented by a distance field, Booleans operations with min/max functions can be applied to the implicial field, any number of times without degrading the quality of the distance field. In addition, relief texturing can applied to the field, without having the implicial field loose its differentiability. Offsets also become possible, and the streamlines can be used as projectors for the purpose of bit mapping.

The invention is described in terms that enable any person skilled in the art to make and use the invention, and is provided in the context of particular example applications and their requirements. Various modifications to the preferred embodiments will be readily apparent to those skilled in the art, and the principles described herein may be applied to other embodiments and applications without departing from the spirit and scope of the invention. Thus, the present invention is not intended to be limited to the embodiments described herein, but is to be accorded with the broadest scope of the claims below, consistent with the principles and features disclosed herein.

I claim:

1. A method for regularizing a distance field representing a graphics model, the distance field including a plurality of variable scalar values and a set of fixed zero scalar values; comprising:

implizitizing the graphics object so that the distance field is an implicial field;

evaluating the implicial field using a cost function optimized according predetermined parameters to determine a cost of the implicial field;

determining if the cost satisfies a predetermined threshold; and perturbing the variable scalar values while holding the zero scalar values fixed, and repeating the evaluating, determining, perturbing steps until the predetermined threshold is satisfied to generate a regularized implicial field.

2. The method of claim 1 wherein the set of fixed zero scalar values represents a boundary of the graphics model.

3. The method of claim 2 wherein the boundary is a surface of the graphics model.

4. The method of claim 1 wherein the predetermined parameters define a minimum energy.

5. The method of claim 1 wherein the predetermine threshold is a minimum cost.

6. The method of claim 1 wherein the predetermined threshold is a minimum rate of change in the cost.

7. The method of claim 1 wherein the perturbing is random.

8. The method of claim 1 wherein a texture of the graphics object is represented by a bit map including a plurality of pixels, and further comprising:

positioning the bit map with respect to the fixed zero scalar values;

determining a streamline from each pixel to a corresponding zero scalar value; and texturing the corresponding zero scalar value according to the pixel associated with the streamline.

9. The method of claim 8 wherein the texturing colors the corresponding zero scalar value.

10. The method of claim 8 wherein a position of the bit map is arbitrary with respect to the graphics object.

11. The method of claim 8 wherein each streamline follows a gradient of the regularized distance field.

12. The method of claim 1 further comprising:

arbitrarily positioning an image with respect to the fixed zero scalar values, the image including a plurality of image values at a plurality of locations in the image;

determining a streamline from each location in the image to a corresponding zero scalar value; and mapping the image value of each location to the corresponding zero scalar value associated with the streamline.

13. The method of claim 12 wherein the image is parametrically defined and the fixed scalar zero values are generated by a cubic function.

14. The method of claim 1 wherein a texture of the graphics object is represented by a bit map including a plurality of pixels, and further comprising:

positioning the bit map with respect to the fixed zero scalar values;

determining a first streamline from each pixel to a corresponding zero scalar value;

texturing the corresponding zero scalar value according to the pixel associated with the first streamline;

arbitrarily positioning an image with respect to the fixed zero scalar values, the image including a plurality of image values at a plurality of locations in the image;

determining a second streamline from each location in the image to a corresponding zero scalar value; and mapping the image value of each location to the corresponding zero scalar value associated with the second streamline to stencil the image onto a textured surface of the graphics object.

15. The method of claim 1 wherein the implicial field is generated from fractals.

16. The method of claim 1 wherein the implicial field is an equipotential field.

17. The method of claim 1 wherein the implicial field is non-differentiable to generate discontinuities.

18. The method of claim 1 wherein the implicial field is generated from a finite set of discrete points.

* * * * *